US007808745B2

(12) United States Patent
Oh

(10) Patent No.: US 7,808,745 B2
(45) Date of Patent: Oct. 5, 2010

(54) HARD DISK DRIVE HAVING CRASH STOPPER AND METHOD OF ASSEMBLING THE SAME

(75) Inventor: Young-rok Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 591 days.

(21) Appl. No.: 11/781,327

(22) Filed: Jul. 23, 2007

(65) Prior Publication Data

US 2008/0204941 A1     Aug. 28, 2008

(30) Foreign Application Priority Data

Feb. 22, 2007     (KR) .............. 10-2007-0018101

(51) Int. Cl.
 *G11B 21/22*     (2006.01)
(52) U.S. Cl. .................................. 360/256.2
(58) Field of Classification Search ........... None
 See application file for complete search history.

(56) References Cited

U.S. PATENT DOCUMENTS

| 5,663,855 | A | * | 9/1997 | Kim et al. | ............... 360/256.2 |
| 5,956,213 | A | * | 9/1999 | Dague et al. | ............... 360/256.2 |
| 5,973,888 | A |  | 10/1999 | Chawanya et al. | |
| 6,252,745 | B1 | * | 6/2001 | McReynolds et al. | .... 360/265.1 |
| 6,449,129 | B1 | * | 9/2002 | Macpherson et al. | ...... 360/254.8 |
| 6,535,357 | B1 | * | 3/2003 | Misso et al. | ............. 360/256.2 |
| 6,704,166 | B1 | * | 3/2004 | Turner et al. | ................ 360/256 |
| 7,486,482 | B2 | * | 2/2009 | Kim | ........................ 360/256.2 |
| 7,505,231 | B1 | * | 3/2009 | Golgolab et al. | ......... 360/265.7 |

FOREIGN PATENT DOCUMENTS

| JP | 2003-151226 | 5/2003 |
| JP | 2004-355778 | 12/2004 |
| JP | 2006-040373 | 2/2006 |
| KR | 19990056326 | 7/1999 |
| KR | 10-0262678 | 5/2000 |
| KR | 100513378 B1 | 8/2005 |

* cited by examiner

*Primary Examiner*—Mark Blouin
(74) *Attorney, Agent, or Firm*—Volentine & Whitt, PLLC

(57) ABSTRACT

A hard disk drive includes a base, a head stack assembly (HSA) that is mounted to the base so as to be rotatable relative to the base, a voice coil motor (VCM) block that has an upper section and a lower section respectively disposed above and below a voice coil support of the HSA, and a crash stopper that limits the rotation of the HSA at the voice coil support. The upper section of the VCM block has a through-hole through which the crash stopper extends into a space between the upper and lower sections of the VCM block. The lower section of the VCM block has a groove in which the crash stopper is received. The hard disk drive can be assembled in a top down manner to allow the assembly process to be fully automated.

18 Claims, 5 Drawing Sheets

HARD DISK DRIVE HAVING CRASH STOPPER AND METHOD OF ASSEMBLING THE SAME

BACKGROUND OF THE INVENTION

1. Field of the Invention

The present invention relates to a hard disk drive. More particularly, the present invention relates to a head stack assembly (HSA) of a hard disk drive having a swing arm and a crash stopper that limits the rotation of the swing arm. The present invention also relates to a method of assembling such a hard disk drive.

2. Description of the Related Art

Hard disk drives (HDDs) serve as auxiliary memory devices for computers, MP3 players, and mobile phones. To this end, an HDD has a head stack assembly (HSA) that includes a swing arm, and a magnetic read/write head supported by the swing arm for recording data on a disc or reading data from the disc. The swing arm of the HSA is mounted on a base so as to be rotatable in clockwise and counter-clockwise directions relative to the base. A voice coil motor rotates the swing arm to position the magnetic head over a desired location on the disk (i.e., over a desired track) onto which data is to be recorded or from which data is to be reproduced. The HSA also has a crash stopper that limits the rotation of the swing arm to a predetermined range.

FIG. 1 is a perspective view of a conventional hard disk drive 10, and FIG. 2 is a plan view of another conventional hard disk drive 30.

Referring to FIG. 1, the conventional hard disk drive 10 includes a base 11, a disc 12 rotated at a high speed by a spindle motor mounted to the base 11, an HSA 15, and a voice coil motor (VCM) block 20. The HSA 15 includes a swing arm mounted to the base 11 so as to be rotatable, a head slider comprising the magnetic read/write head mounted on one end of the swing arm, and a voice coil support 17 integral with the other end of the swing arm. A voice coil motor, made up of the (VCM) block 20 and a voice coil (not shown) wound around the voice coil support 17, rotates the swing arm of the HSA 15 in clockwise and counterclockwise directions.

The VCM block 20 includes an upper yoke 21 and a lower yoke 23, which are respectively disposed above and below the voice coil support 17 of the HSA 15, and a pair of magnets (not shown) which are respectively attached to inner surfaces of the upper yoke 21 and the lower yoke 23. The VCM block 20 is mounted to the base 11 by a pair of screws 25 and 26. Also, the VCM block 20 also includes a crash stopper 27 that limits the rotation of the swing arm of the HSA 15 in the clockwise direction. That is, the coil support 17 of the HSA 15 bumps against the crash stopper 27 when the HSA 15 rotates a certain amount in the clockwise direction, whereby the crash stopper 27 prevents the swing arm from rotating further in the clockwise direction.

The VCM block 20 is mounted to the base 11 as follows. First, the crash stopper 27 is inserted between and attached to the upper yoke 21 and the lower yoke 23, and one side of the VCM block 20 is fixed to the base 11 using the screw 25. Next, the VCM block 20 is rotated in a counterclockwise direction about the screw 25 until the other side of the VCM 20 is disposed over the base 11. Then, the other side of the VCM block 20 is fixed to the base 11 using the screw 26. Obviously, the base 11 must be a so called 'flat type' of base, i.e., must have a flat upper surface, to facilitate this method of mounting the VCM block 20 to the base 11. However, the flat type of base 11 is relatively thick. Accordingly, it can be difficult to incorporate the conventional hard disk drive 10 into current electronic apparatuses that tend to be smaller and thinner than those in the past.

Referring to FIG. 2, the conventional hard disk drive 30 includes a base 31, a disc 32 rotated at a high speed by a spindle motor mounted to the base 32, an HSA 35, and a VCM block 40. The base 31 is a so called 'bowl type' of base having a concavity in which the disc 32, the HSA 35, and the VCM block 40 are received. The conventional hard disk drive 30 also includes a main circuit board (not shown) mounted to the underside of the base 11, a flexible printed circuit (FPC) 42 electrically connecting the main circuit board to the HSA 35, and FPC bracket 45 that fixes and end of the FPC 42 to the base 31. The HSA includes a swing arm supported by the base 31 so as to be rotatable about an axis 36, and a head slider 39 (comprising the magnetic read/write head) attached to an end of the swing arm. A VCM, made up of the VCM block 40 and a voice coil (not shown), rotates the swing arm about axis 36 in clockwise and counterclockwise directions.

The conventional HSA 30 also has a crash stopper 47 that limits the rotation of the swing arm of the HSA 35 in the clockwise direction. The crash stopper 47 is attached to the FPC bracket 45. A protrusion 37 of the swing arm of the HSA 35 bumps against the crash stopper 47 when the HSA 35 rotates a certain amount in the clockwise direction, whereby the crash stopper 47 prevents the swing arm of the HSA 35 from rotating further in the clockwise direction.

However, the range of rotation of the swing arm of the HSA 35 can be set erroneously by the crash stopper 47 because of tolerances in the shape or mounting of the FPC bracket 45 to which the crash stopper 47 is attached. In this respect, the distance S2 between the axis of rotation 36 of the swing arm and the terminus of the protrusion 37 is much smaller than the distance S1 between the axis of rotation 36 of the swing arm and the head slider 39. Accordingly, even slight errors in the location of the crash stopper 47 relative to the terminus of the protrusion 37 can translate into large errors in the range of rotation of the swing arm of the HSA 35. In particular, slight errors in the location of the crash stopper 47 relative to the terminus of the protrusion 37 can prevent the swing arm of the HSA 35 from rotating over its entire designed range of rotation. In this case, the magnetic read/write head will not be able to record data onto or read data from a portion of the disk 32

SUMMARY OF THE INVENTION

An object of the present invention is to solve the above-described problems and drawbacks of the prior art.

More specifically, one object of the present invention is to provide a hard disk drive having a crash stopper that can precisely limit the rotation of a head stack assembly (HSA) in one direction.

Another object of the present invention is to provide a top down assembly method for use in manufacturing a hard disk drive.

According to an aspect of the present invention, there is provided a hard disk drive comprising a base, a head stack assembly (HSA) mounted to the base so as to be rotatable, a voice coil wound on a voice coil support of the HSA, a voice coil motor (VCM) block mounted to the base, and a crash stopper extending through a through-hole in an upper section of the VCM block and into a space defined between upper and lower sections of the VCM block. The upper and lower sections of the VCM block are respectively disposed above and below the voice coil support of the HSA. The lower section may have a groove in which an end of the crash stopper is received such that the crash stopper is seated. The crash stopper is postioned relative to the HSA to limit the rotation of the HSA in one direction about the axis of rotation of the HSA.

The hard disk drive may also comprise a magnetic latch. Preferably, the magnetic latch has a latch pin that protrudes from the voice coil support of the HSA so as to rotate with the HSA, a magnet attached to the latch pin, and a latch column integral with the VCM block. The latch column is located in the path of the magnet when the HSA is rotated in one direction, and the crash stopper is located in the path of the magnet when the HSA is rotated in the other direction. The crash stopper is formed of a non-magnetic material, and preferably, of stainless steel.

The hard disk drive may also comprise a damper that contacts an upper surface of the upper section of the VCM block and covers the through-hole through which the crash stopper extends.

According to an aspect of the present invention, there is provided an assembly method for use in the manufacturing of a hard disk drive, comprising fixing a lower section of a voice coil motor (VCM) block on a base, mounting a head stack assembly (HSA) of the hard disk drive to the base so as to be rotatable and such that a voice coil support of the HSA lies over the lower section of the VCM block, fixing an upper section of the VCM block to the lower section of the VCM block so that the upper section lies over the voice coil support and the lower section, and inserting a crash stopper vertically through the upper section of the VCM block and into a space defined between the upper and lower sections of the VCM block.

The crash stopper may be inserted into the VCM block until an end of the crash stopper is received in a groove in the lower section of the VCM block, and is thereby seated on the lower section.

Subsequently, a damper may be placed against the upper section of the VCM block and over the through-hole so that the through-hole is covered by the damper.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

Figure 3:
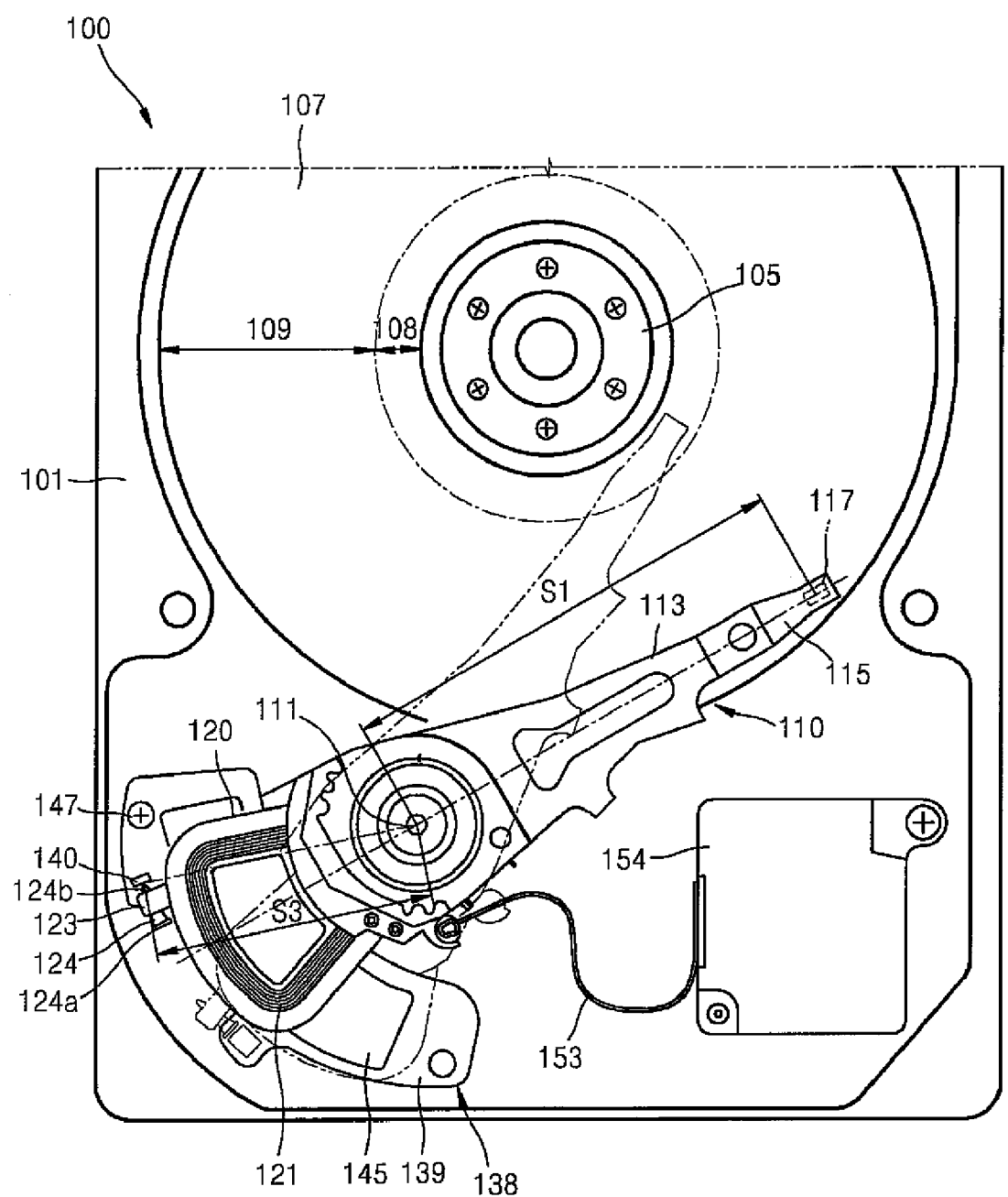
FIG. 3 is a plan view of a hard disk drive according to the present invention.
Figure 4:
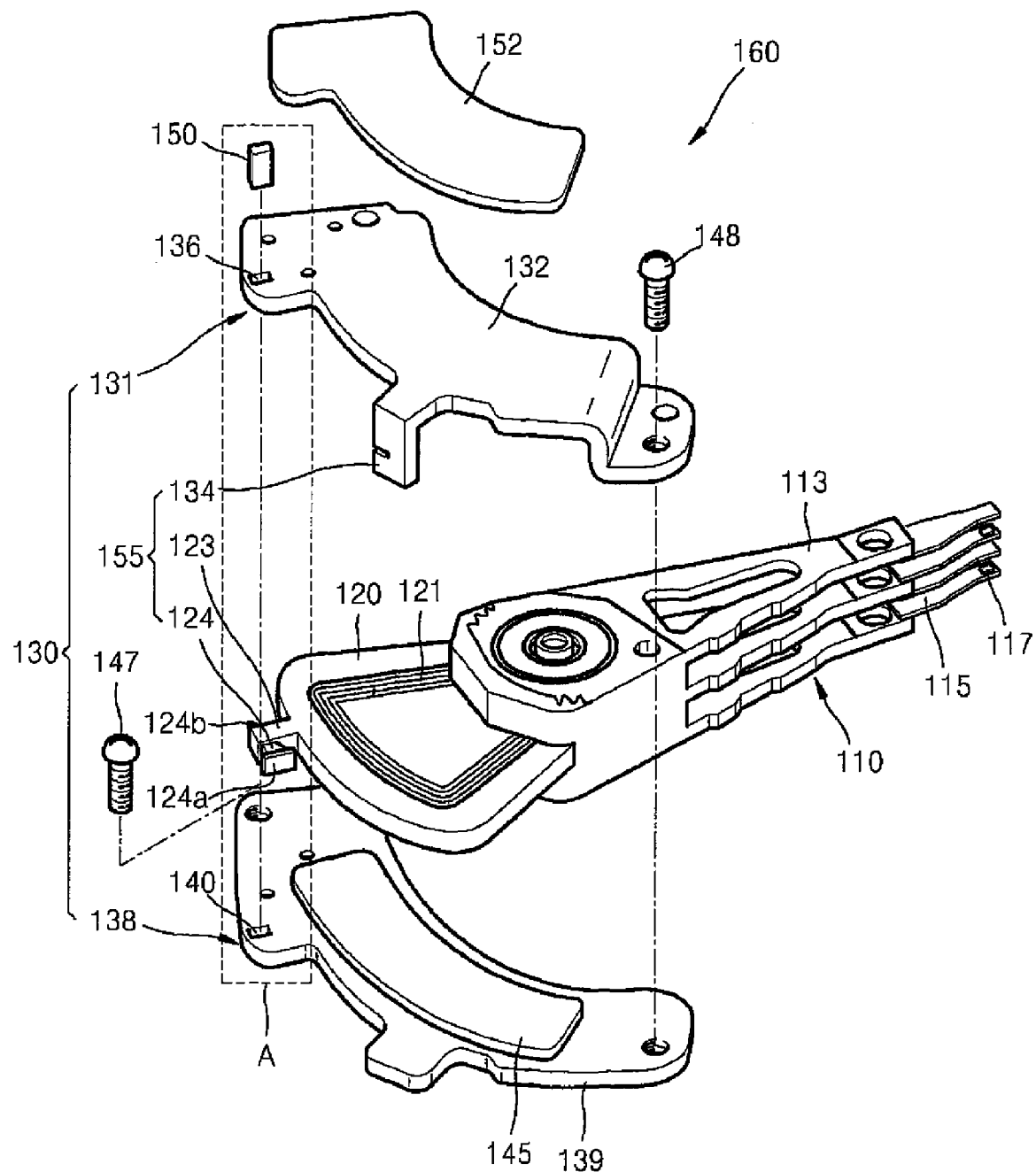
FIG. 4 is an exploded perspective view of a voice coil motor and HSA of the hard disk drive of FIG. 3.

Referring to FIGS. 3 and 4, a hard disk drive 100 according to the present invention includes a base 101, a spindle motor 105 mounted to the base 101, a disc 107 mounted to the spindle motor 105 so as to be rotated at a high speed by the spindle motor 105, a head stack assembly (HSA) 110, and a voice coil motor (VCM) 160 including a VCM block 130. The base 101 is a so called 'bowl type' of base having a concavity in which the disc 107, the HSA 110, and the VCM block 130 are received. The hard disk drive 100 also includes a cover (not shown) coupled to the base 101 to protect the spindle motor 105, the disc 107, and the HSA 110.

The HSA 110 includes a swing arm 113 mounted to the base 101 so as to be rotatable, a suspension 115 coupled to a front end of the swing arm 113, a head slider 117 attached to the suspension 115, and a voice coil support 120 integral with a rear end of the swing arm 113. A voice coil 121 is wound around the voice coil support 120 of the HSA 110. The head slider 117 comprises a magnetic read/write head for recording or reading data onto or from the disc 107. The suspension 115 biases the head slider 117 and hence, the magnetic read/write head, toward the surface of the disc 107.

The VCM block 130 has an upper section 131 and a lower section 138 respectively disposed above and below the voice coil support 120. The upper section 131 includes an upper yoke 132 and an upper magnet (not shown) attached to the underside of the upper yoke 132 so as to face the coil support 120. The lower section 138 includes a lower yoke 139 and a lower magnet 145 attached to an upper side of the lower yoke 139 so as to face the coil support 120. The lower section 138 of the VCM block 130 is fixed to the base 101 by first and second screws 147 and 148, and the upper section 131 is fixed to the lower section 138 by the second screw 148.

The VCM block 130 and the voice coil 121 constitute the voice coil motor 160. A main circuit board (not shown) is attached to the underside of the base 101, and is electrically connected to the HSA 110 by a flexible printed circuit (FPC) 153. More specifically, an end of the FPC 153 is fixed to an FPC bracket 154 mounted to the base member 101. The FPC bracket 154 connects the FPC 153 to the main circuit board. The voice coil motor 160 rotates the swing arm 113 of the HSA 110 in clockwise and counterclockwise directions as controlled by a servo control system provided by the main circuit board. In particular, the servo control system controls the supply of current to the voice coil 121. The swing arm 113 of the HSA 110 is rotated in a direction according to Fleming's left hand rule due to the flow of current, through the voice coil 121, within the magnet field formed by the magnets of the VCM block 130.

When the hard disk drive 100 is not in operation, that is, when the disc 107 is not rotating, the head slider 117 is parked so that the head slider 117 and the disc 107 cannot bump against each other if the HDD receives a shock. Systems for parking the head slider 117 include a ramp type of parking system and a contact start stop (CSS) type of parking system. The ramp type of parking system has a ramp disposed radially outwardly of the disc. The head slider 117 is parked on the ramp when the HDD is not operating. The hard disk drive 100 of the embodiment of FIG. 3 of the present invention employs the CSS type of parking system. In this system, the swing arm 113 of the HSA 110 rotates in the counter-clockwise direction when the disc 107 of the hard disk drive 100 stops rotating such that the head slider 117 moves from a recording region 109 of the disc 107 to a parking region 108 of the disc 107. The parking region 108 of the disk 107 is located at the inner periphery of the disc 107. When the disc 107 resumes rotating, the swing arm 113 of the HSA 110 rotates in the clockwise direction. Accordingly, the head slider 117 moves to the recording region 109 of the disc 107 and the magnetic head integrated with the head slider 117 records or reads data onto or from the disc 107.

The hard disk drive 100 according to the present invention also includes a magnetic latch 155 that prevents the swing arm 113 of the HSA 110 from being rotated by external shocks when the head slider 117 is parked. More specifically, the magnetic latch 155 limits the rotation of the swing arm 113 of the HSA 110 in the counter-clockwise direction to prevent the head slider 117 from colliding with the spindle motor 105 and thus, prevents the head slider 117 from being damaged. The magnetic latch 155 includes a latch pin 123 protruding from an end of the voice coil support 120, a latch column 134 unitary with the upper yoke 132, and a latch magnet 124 mounted to and extending through the latch pin 123. The latch column 134 is of a material that produces a magnetic force of attraction with the latch magnet 124.

As shown best in FIG. 3, a side 124a of the latch magnet 124 attaches to the latch column 134, due to the magnetic force of attraction between the latch magnet 124 and the latch column 134, when the head slider 117 is moved over the parking region 108 of the disc 107. Thus, even if an external shock is applied to the HDD 100, the HSA 110 remains stationary, i.e., the head slider 117 remains parked. However, the driving force produced by the voice coil motor 160 is greater than the magnetic force of attraction between the latch magnet 124 and the latch column 134. Therefore, if current is supplied to the voice coil 121, the swing arm 113 of the HSA 110 is unlocked and the head slider 117 moves over the recording region 109 of the disk 107.

Figure 5:
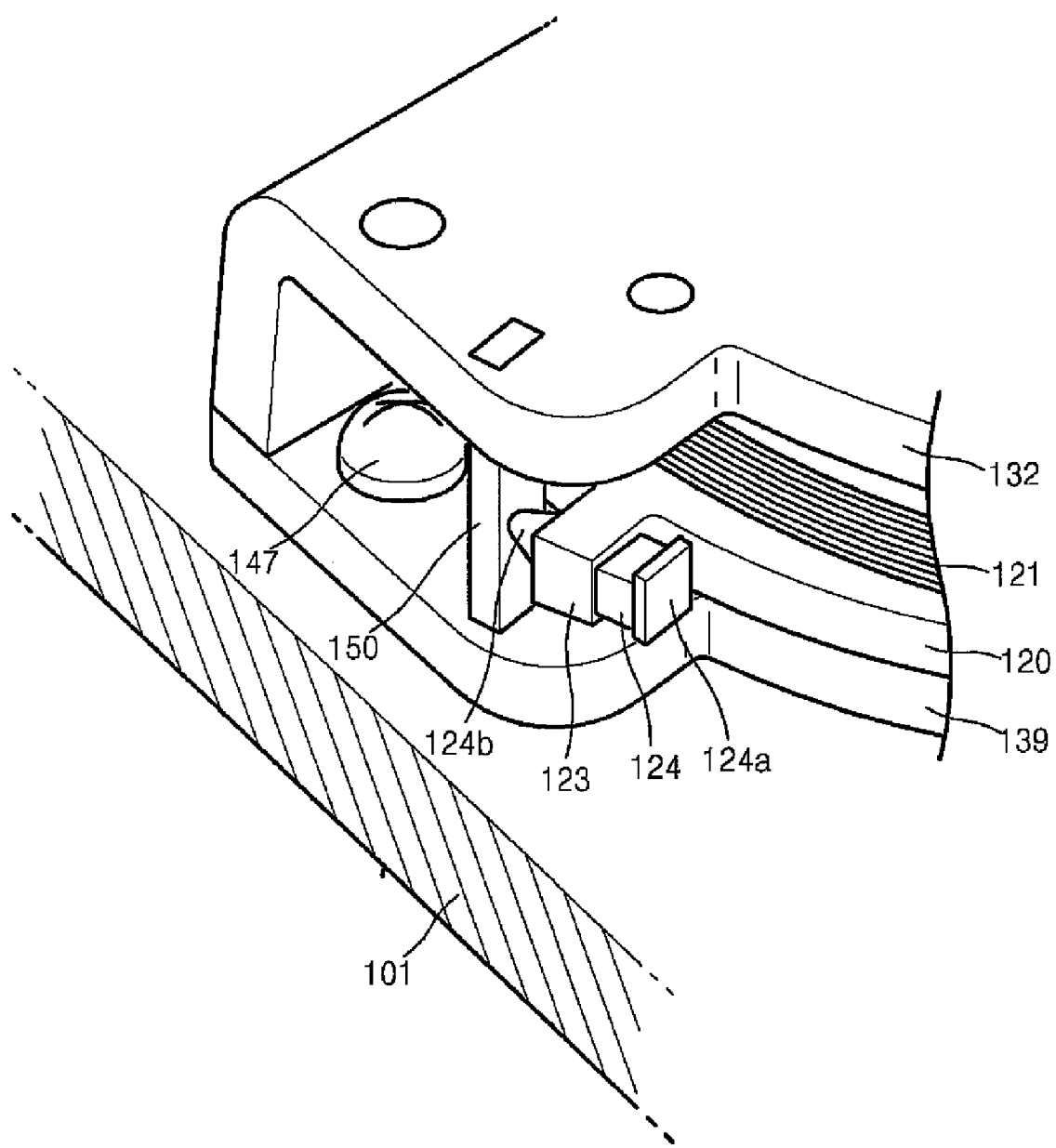
FIG. 5 is an enlarged perspective view of portion A of FIG. 4 of the voice coil motor and HSA of the hard disk drive according to the present invention.

Referring now to FIGS. 4 and 5, the hard disk drive 100 further includes a crash stopper 150 that limits the rotation of the swing arm 113 of the HSA 110 in the clockwise direction. The upper yoke 132 of the VCM block 130 has a crash stopper through-hole 136 extending in a direction substantially parallel to the axis of rotation of the HSA and through which the crash stopper 150 extends. The lower yoke 139 of the VCM block 130 has a crash stopper seating groove 140 into which a lower part of the crash stopper 150 extends so as to be seated on the lower yoke 139. Thus, the crash stopper 150 cannot move horizontally relative to the VCM block 130.

Again, referring back to FIG. 3, the other side 124b of the latch magnet 124 collides with the crash stopper 150 when the head slider 117 arrives at the outer periphery of the disc 107 as the swing arm 113 of the HSA 110 is rotated in the clockwise direction. Thus, the crash stopper 150 limits the rotation of the swing arm 113 of the HSA 110 in the clockwise direction. Also, the crash stopper 150 is formed of a non-magnetic material to prevent the latch magnet 124 from attaching to the crash stopper 150. To this end, the crash stopper 150 may be formed of stainless steel. Stainless steel has the additional advantages of high strength and can be machined to precise dimensions so that the crash stopper 150 can be easily inserted into the crash stopper through-hole 136.

Figure 1:
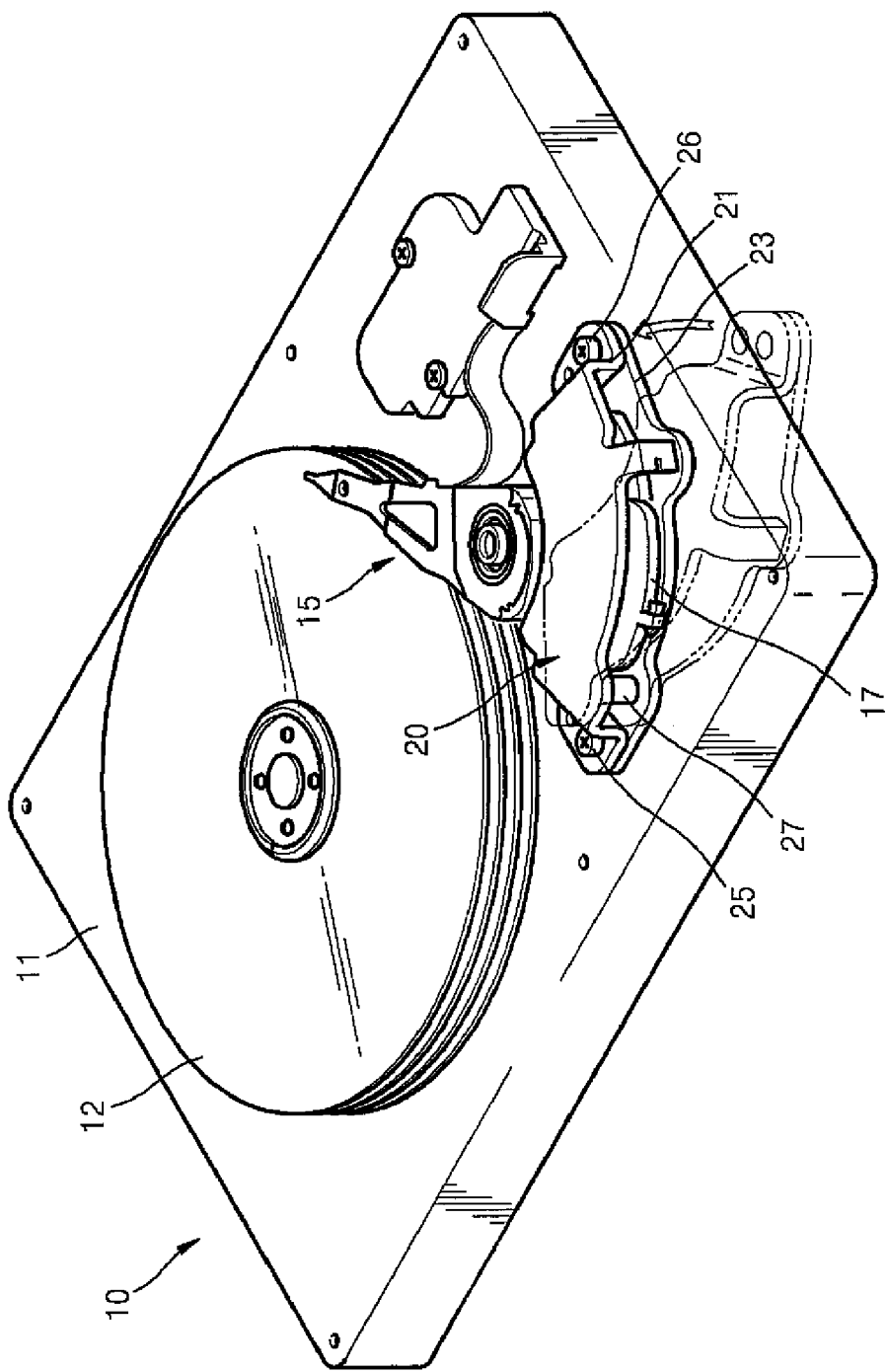
FIG. 1 is a perspective view of a conventional hard disk drive.
Figure 2:
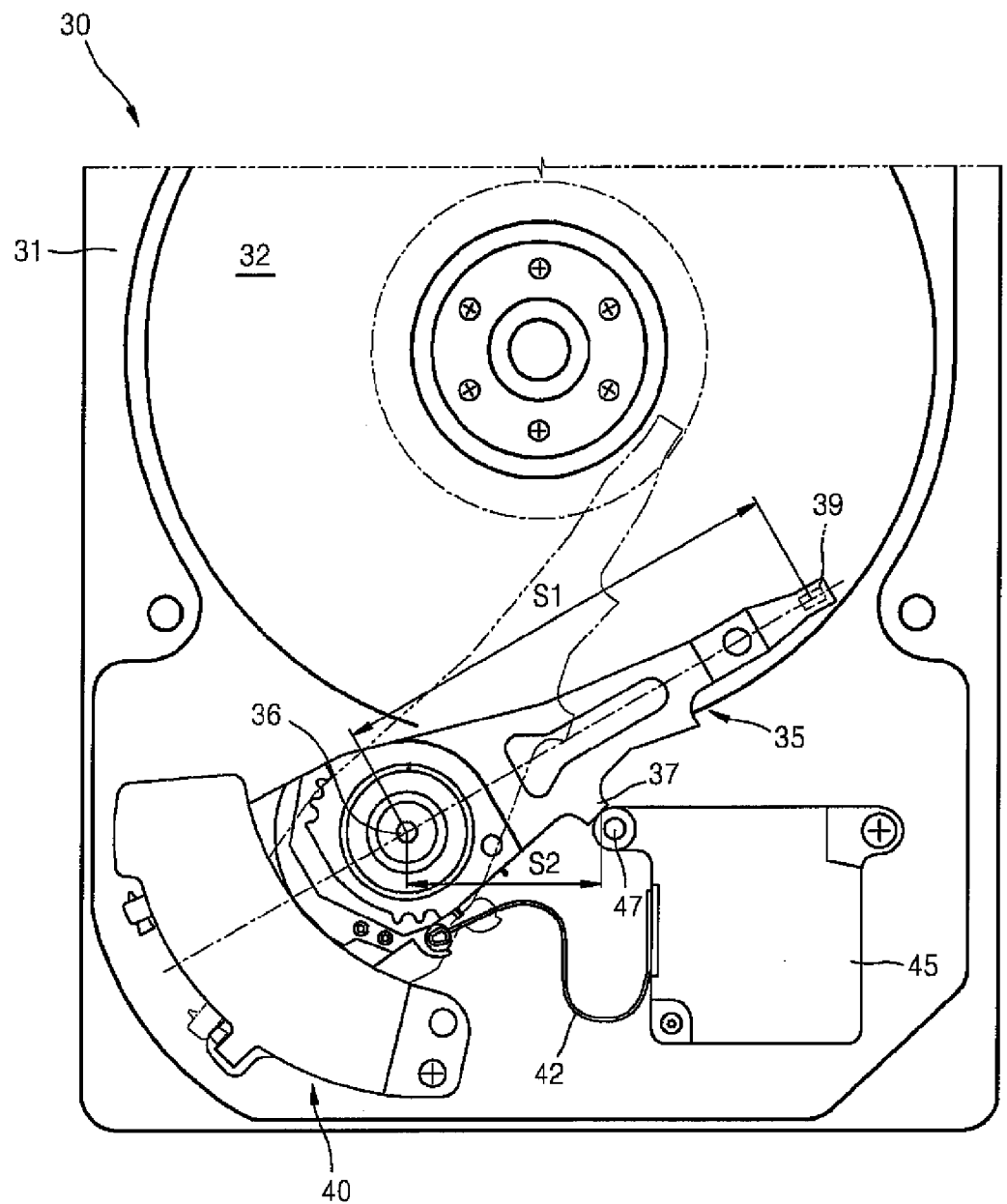
FIG. 2 is a plan view of another conventional hard disk drive.

Furthermore, the ratio (S1/S3) of the distance (S1) between the axis 111 of rotation of the swing arm 113 and the head slider 117 to the distance (S3) between the axis of rotation 111 of the swing arm 113 of the HSA 110 and the other side 124b of the latch magnet 124 is greater than the ratio S2/S1 of the conventional hard disk drive 30 of FIG. 2. Therefore, errors in the location of the crash stopper 150 translate into smaller errors in the range of rotation of the swing arm 113 of the HSA 110, as compared to errors of the same magnitude in the location of the crash stopper 47 of the prior art of FIG. 2.

Finally, the HDD 100 may also include a damper 152 interposed between the upper plate 131 and the cover coupled to the base 101. The damper 152 contacts both an upper surface of the upper plate 131 and an inner surface of the cover. The damper 152 can be formed of an elastic porous material or can be a hardened liquid phase gasket. The damper 152 thus provides a buffer between the upper plate 131 and the cover, and prevents the crash stopper 150 from moving in a vertical direction relative to the VCM block 130.

A method of assembling the hard disk drive 100 according to the present invention will now be described. The hard disk drive 100 is assembled using a so-called 'top down method' in which members that constitute the hard disk drive 100 are sequentially disposed on the base 101. The top down method of assembling the hard disk drive 100 enables the assembly process to be automated.

Referring to FIGS. 3 through 5, first, the spindle motor 105 is mounted to the base 101, and the disc 107 is fixed to the spindle motor 105. The lower plate 138 of the VCM block 130 is fixed to the base 101 using the first screw 147. Then, the HSA 110 is mounted to the base 101 with the voice coil support 120 overlying the lower plate 138. At this time, the head slider 117 is parked over the parking region 108 of the disc 107.

Then, the upper plate 131 of the VCM block 130 is placed on the lower plate 138 and the voice coil support 120, and the upper plate 131 is fixed to the lower plate 138 using the second screw 148. In this respect, the second screw 148 is inserted into the base 101 through the lower plate 138 such that the lower plate 138 is further fixed to the base 101. As a result, the voice coil support 120 is interposed between the upper plate 131 and the lower plate 138.

Then, the crash stopper 150 is inserted into the crash stopper through-hole 136 in the upper yoke 132 from above, i.e., in a direction substantially parallel to the axis of rotation of the HSA. The lower end of the crash stopper 150 is received in the crash stopper seating groove 140 in the lower yoke 139 so as to be seated on the lower yoke 139. Then, the damper 152 is set on the upper plate 131 to cover the crash stopper through-hole 136. If the damper 152 is formed of a porous material, the damper 152 is first attached to an inner surface of the cover (not shown) and the cover is then coupled to the base 101 so that the damper 152 rests in contact with the upper plate 131. If the damper 152 is a liquid phase gasket, the inner surface of the cover is coated with the liquid phase of the gasket material, and the cover is then coupled to the base 101 to squeeze the material between the cover and the upper plate 131. The liquid phase material then hardens in contact with the upper plate 131 to form the gasket.

According to the present invention as described above, tolerances in the shape or mounting of an FPC bracket do not affect the range of rotation of the swing arm of the HSA. Accordingly, the range of rotation can be set precisely so as to ensure that the full capacity of the disc can be utilized for recording and reproducing data.

Also, the crash stopper can be mounted to a VCM block using a top down method. Therefore, the hard disk drive can be assembled using automated equipment to keep manufacturing costs of the HDD down. Also, a bowl type of base can be used so that the resulting HDD can be relatively thin.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A hard disk drive comprising:
   a base;
   a head stack assembly (HSA) mounted to the base so as to be rotatable about an axis of rotation, the HSA including a swing arm, a head slider having a read/write head attached to one end of the swing arm, and a voice coil support integral with the swing arm;
   a voice coil wound on the voice coil support;
   a voice coil motor (VCM) block mounted to the base, the VCM block having an upper section and a lower section respectively disposed above and below the voice coil support, the upper section having a through-hole extending therethrough in a direction substantially parallel to the axis of rotation of the HSA;
a first screw fixing the lower section of the VCM block to the base;
a second screw fixing the upper section of the VCM block to the lower section of the VCM block; and
a crash stopper offset from the first and second screws in a plane perpendicular to the axis of rotation of the HSA, the crash stopper extending through the through-hole of the upper section of the VCM block and into a space defined between the upper and lower sections of the VCM block, and the crash stopper being located to limit the rotation of the HSA in one direction about the axis of rotation.

2. The hard disk drive of claim 1, further comprising a magnetic latch comprising a latch pin that protrudes from the voice coil support of the HSA so as to rotate with the HSA about the axis of rotation, a magnet attached to the latch pin, and a latch column protruding from the upper section of the VCM block towards the lower section of the VCM block, and wherein the latch column is located in the path of the magnet when the HSA is rotated in one direction about the axis of rotation, and the crash stopper is located in the path of the magnet when the HSA is rotated in the other direction about the axis of rotation.

3. The hard disk drive of claim 2, wherein the crash stopper is of a non-magnetic material.

4. The hard disk drive of claim 3, wherein the crash stopper is of stainless steel.

5. The hard disk drive of claim 1, wherein the lower section of the VCM block defines a groove into which a lower end of the crash stopper is received, and the crash stopper rests on the lower section of the VCM block at the bottom of the groove such that the crash stopper is seated on the lower section of the VCM block.

6. The hard disk drive of claim 1, further comprising a damper contacting an upper surface of the upper section of the VCM block and covering the through-hole that extends through the upper section of the VCM block.

7. The hard disk drive of claim 1, wherein the base has a concavity in which the HSA and the VCM block are received.

8. An assembly method in the manufacturing of a hard disk drive, comprising:
fixing a lower section of a voice coil motor (VCM) block to a base with a first screw;
mounting a head stack assembly (HSA) of the hard disk drive to the base so as to be rotatable about an axis of rotation and such that a voice coil support, around which a voice coil is wound, lies over the lower section of the VCM block;
fixing an upper section of the VCM block to the lower section of the VCM block with a second screw so that the upper section lies over the voice coil support and the lower section; and
inserting a crash stopper, in said direction substantially parallel to the axis of rotation of the HSA, through a through-hole in the upper section of the VCM block and into a space defined between the upper and lower sections of the VCM block after the lower section of the VCM block has been fixed to the base and the upper section of the VCM block has been fixed to the lower section of the VCM block with the first and second screws.

9. The method of claim 8, wherein said inserting of the crash stopper comprises inserting the crash stopper until an end of the crash stopper abuts the lower section of the VCM block at the bottom of a groove in the lower section of the VCM block, whereby the crash stopper is seated on the lower section.

10. The method of claim 8, further comprising subsequently placing a damper against the upper section of the VCM block and over the through-hole so that the through-hole is covered by the damper.

11. A hard disk drive comprising:
a base;
a head stack assembly (HSA) mounted to the base so as to be rotatable about an axis of rotation, the HSA including a swing arm, a head slider having a read/write head attached to one end of the swing arm, and a voice coil support integral with the swing arm;
a voice coil wound on the voice coil support;
a voice coil motor (VCM) block mounted to the base, the VCM block having an upper section and a lower section respectively disposed above and below the voice coil support, the upper section having a through-hole extending therethrough in a direction substantially parallel to the axis of rotation of the HSA; and
a body, having a cross section substantially the same in size and shape as that of the through-hole, and exposed in the space defined between the upper and lower sections of the VCM block, the body also being received in the through hole, and the body being located in said space to contact the HSA in when the HSA rotates in one direction about the axis of rotation wherein the body constitutes a crash stopper to limit the rotation of the HSA in said one direction.

12. The hard disk drive of claim 11, further comprising a latch magnet integral with the voice coil support of the HSA so as to rotate with the HSA about the axis of rotation, and wherein the body constituting the crash stopper is exposed in the path of the latch magnet when the HSA is rotated in said one direction.

13. The hard disk drive of claim 12, wherein the body constituting the crash stopper is of a non-magnetic material.

14. The hard disk drive of claim 12, further comprising a latch column integral with the VCM block, and wherein the latch column is located in the path of the magnet when the HSA is rotated in the other direction about the axis of rotation.

15. The hard disk drive of claim 11, wherein the lower section of the VCM block defines a groove into which a lower end of the crash stopper is received, and the crash stopper rests on the lower section of the VCM block at the bottom of the groove such that the crash stopper is seated on the lower section of the VCM block.

16. The hard disk drive of claim 11, further comprising a damper contacting an upper surface of the upper section of the VCM block and covering the through-hole that extends through the upper section of the VCM block.

17. The hard disk drive of claim 11, wherein the base has a concavity in which the HSA and the VCM block are received.

18. The hard disk drive of claim 11, further comprising a first screw fixing the lower section of the VCM block to the base; and
a second screw fixing the upper section of the VCM block to the lower section of the VCM block, and
wherein the body constituting the crash stopper is offset from the first and second screws in a plane perpendicular to the axis of rotation of the HSA.

* * * * *